Figure 1:
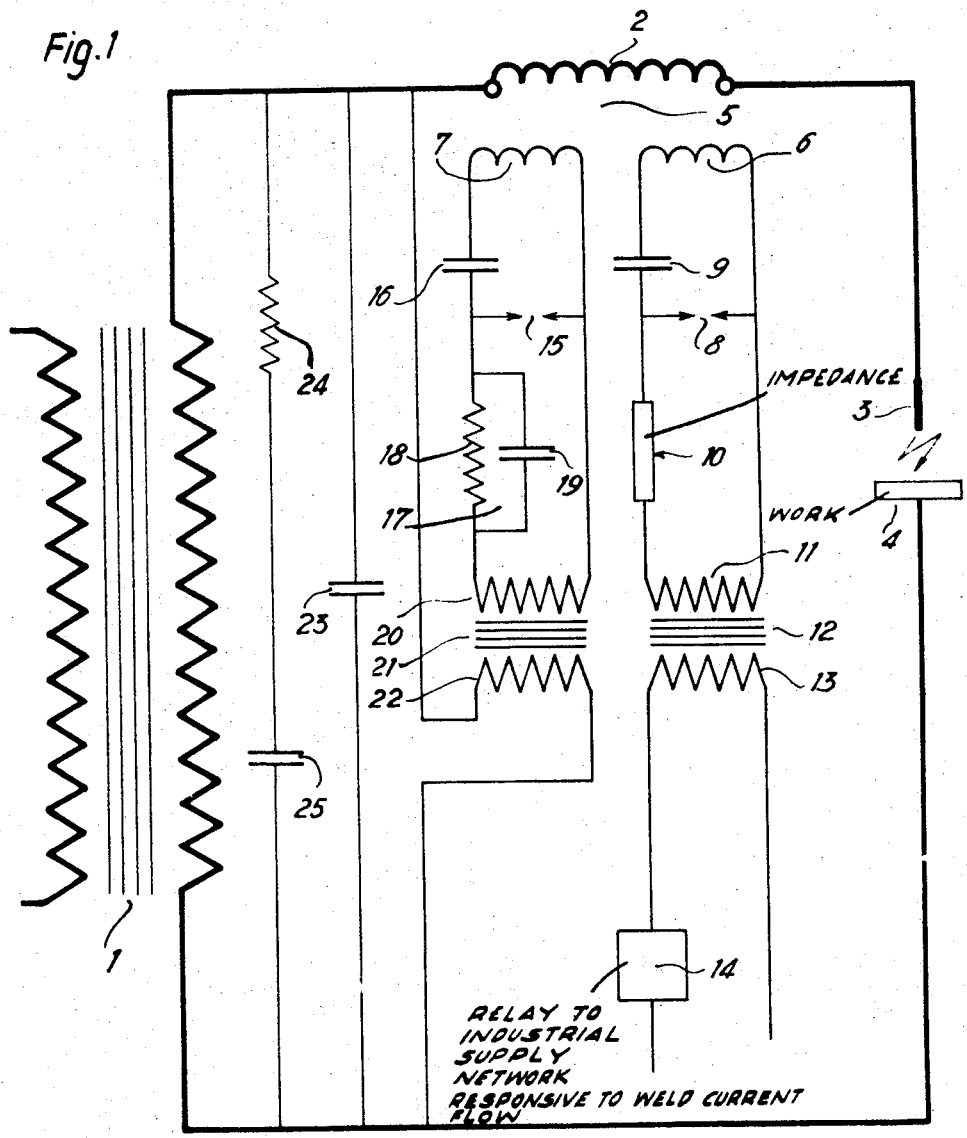

United States Patent [19]
Prischi

[11] 3,751,627
[45] Aug. 7, 1973

[54] APPARATUS FOR INITIATING AND STABILIZING A WELDING ARC

[75] Inventor: Guido Prischi, Antony, France

[73] Assignee: L'Air Liquide, Societe Anonyme pour L'Etude et L'Exploitation des Procedes Georges Claude, Paris, France

[22] Filed: Dec. 28, 1971

[21] Appl. No.: 212,939

[30] Foreign Application Priority Data
Dec. 30, 1970 France .............................. 7047290

[52] U.S. Cl. ............. 219/131 R, 219/135, 315/269, 315/276
[51] Int. Cl. .............................................. B23k 9/10
[58] Field of Search ..................... 219/135, 131, 75, 219/74, 130; 315/171, 269, 274, 276

[56] References Cited
UNITED STATES PATENTS

| | | | |
|---|---|---|---|
| 2,561,995 | 7/1951 | Roberts ......................... | 315/171 X |
| 2,834,917 | 5/1958 | Moignet ........................ | 315/171 X |
| 2,516,016 | 7/1950 | Pakala ........................... | 219/131 R |
| 3,335,317 | 8/1967 | Sciaky ........................... | 219/131 R X |
| 2,629,071 | 2/1953 | Anderson ..................... | 219/131 R X |
| 2,363,332 | 11/1944 | Jennings et al. ................ | 315/276 X |

FOREIGN PATENTS OR APPLICATIONS

| | | | |
|---|---|---|---|
| 729,747 | 5/1955 | Great Britain .................. | 219/131 R |

Primary Examiner—J. V. Truhe
Assistant Examiner—George A. Montanye
Attorney—Irwin S. Thompson et al.

[57] ABSTRACT

This invention relates to welding installations, of the kind that comprise a source of electrical energy at mains frequency, incorporating a supply circuit for a welding electrode and means for forming and emitting high frequency discharges into the supply circuit to the electrode. The pulse-forming means are of the kind incorporating a capacitor and a discharge path such as an arrester, spark gap or other discharger. According to the invention, the pulse-forming means comprise a first circuit including a capacitor and a discharge path, such that the strength of the pulses is sufficient to cause initial striking of the welding arc and being rendered inoperable when an arc welding current has been established and a second pulse-forming circuit also including a capacitor and a discharge path all independent of said first circuit. Said second circuit is supplied at arc voltage and is rendered operable during rapid variation of the arc voltage, the pulses emitted having a strength sufficient to maintain the stability of the arc struck by the first circuit. The pulses or discharges from the first and second circuits are transferred to the arc via a common winding.

3 Claims, 2 Drawing Figures

PATENTED AUG 7 1973 3,751,627

IMPEDANCE

WORK

RELAY TO
INDUSTRIAL
SUPPLY
NETWORK
RESPONSIVE TO WELD CURRENT
FLOW

APPARATUS FOR INITIATING AND STABILIZING A WELDING ARC

The present invention relates to AC electric arc welding utilising a refractory electrode in an inert protective gas, of the type wherein a low AC voltage electrical transformer is used and having a steeply dropping external voltage-current characteristic.

In this art, two problems are met with; on the one hand, difficulties arise in first striking the arc from a distance, i.e., without contact between the electrodes and the part being welded and, on the other hand, the arc must be maintained during the welding operation so that the arc shall remain stable. The initial striking of the arc necessitates previous ionisation of the atmosphere which surrounds the space in which the electrode and the part to be welded are situated: generally, this atmosphere is argon. Such ionisation is effected by causing the emission of a train of high frequency pulses in space. To this end, an auxiliary circuit is usually provided comprising a capacitor having a load circuit in the secondary or high voltage winding of a leakage flux transformer supplied from the mains, and an oscillatory discharge circuit across an arrester or discharger, and an inductor of low value connected in the supply circuit to the welding electrodes.

It will be appreciated that, in order to ensure the first striking, the maximum voltage and the energy from the high frequency oscillations thus produced must be sufficiently high to cause an initial discharge in a previously non-ionised medium.

The second problem is resolved correctly only if pulses are superposed on the voltage supplied by the welding transformer, said pulses being periodically released and, in a well determined area of the alternation of the arc current, and more particularly at the instant immediately following the point on the cycle where the current passes through zero, when the potential of the electrode becomes positive. To this end, use is made of pulse-generating auxiliary circuits, the emission of which is controlled either by the rapid rise in the arc voltage to the value of the no-load voltage of the welding transformer, or by other synchronisation means.

Circuits of this type, if they are suitably adapted to thus maintain the stability of the arc, are, however, not suitable to effect the initial striking of the arc at a distance because the energy and the maximum voltage of the pulses emitted are not sufficient to create ionisation in the inter-electrode space, more particularly when the end of the electrode is cold.

Efforts have, therefore, been made to establish an installation wherein the two circuits described above are coupled to the welding circuit either both in parallel or both in series or one in parallel and the other in series. These couplings usually signify a contradiction as regards the efficiency of operation of the two circuits in question by reason of the impedances which they form in the welding circuit. In other cases an oscillatory circuit has been proposed having an effective output impedance which is variable according to the impedance of the welding circuit in order to reduce the value of the pulses during the welding operation. Such devices are, however, relatively complex and consequently costly. Always when simple means such as a capacitor and arrester or discharger have been used to generate the pulses, it has been preferred to use a single forming circuit and means for causing the level of discharges to vary, for example by providing two dischargers or arresters in parallel and a short circuit relay of one of them, said relay being controlled by the welding current. The later device, although relatively simple, uses a movable member, which is a source of trouble and, above all, does not have a great range of adjustment for one can only act on a single element (the discharger or arrester) in order to differentiate the arc striking pulses from the arc stabilising pulses.

The present invention has for an object a welding installation which shall afford good conditions for both the initial striking of the arc and its maintenance during welding, by using a simple, robust means having great flexibility as regards the formation of the differentiated signals.

The invention consists in a welding installation of the type comprising a source of electrical energy at industrial frequency, having a supply circuit for a welding electrode and means for forming and emitting high frequency discharges in the supply circuit to the electrode, said means being of the kind having a capacitor and a discharge path, wherein the means for forming and emitting the high frequency discharges comprise a first circuit including a capacitor and a discharge path for forming and emitting said high frequency discharges, of sufficient strength to cause initial striking of an arc, said circuit being adapted to be rendered inoperable with the establishment of an arc welding current, and a second circuit for forming and emitting discharges at high frequency, also including a capacitor and a discharge path, independent of said first circuit, supplied at the arc voltage and rendered operable during rapid variation of said arc voltage to emit electrical discharges of strength sufficient to maintain the stability of the arc previously struck by said first circuit, the discharges from the said first and second circuit being transferred to the arc by means of a common winding.

Preferably, the common part connected in the supply circuit to the electrode is formed by the secondary of a high frequency transformer. Thus, separation is ensured from the point of view of isolation between the power circuit (welding circuit) and an auxiliary oscillatory discharge circuit.

Figure 2:
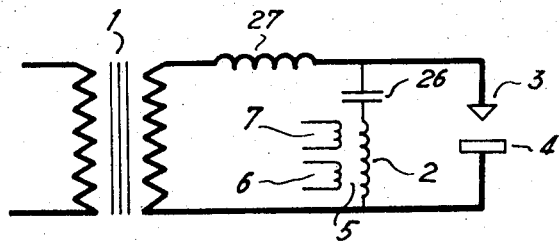

The characteristics and advantages of the invention will appear, moreover, from the description which follows given by way of example with reference to the accompanying drawing, in which:

FIG. 1 shows a diagrammatic view of a welding installation according to the invention, and FIG. 2 shows a partial view of a modified embodiment.

Referring now to the drawings, there is shown a welding installation which comprises a welding transformer 1 arranged for connection to the industrial mains, and supplying under no-load conditions a secondary alternating voltage lower than 80 volts and adapted to supply secondary alternating current of the order of a hundred amperes at a voltage of the order of 20 volts. The transformer 1 supplies an electrode 3 facing a part 4 to be welded, via a coil 2, the coil 2 forms the secondary of a high frequency transformer 5 having two primaries 6 and 7; the primary 6 forms with a discharge path 8, that constitutes means for controlling the discharge, a discharge circuit for a capacitor 9, the load circuit of which comprises, in addition to the primary 6, an impedance 10, the whole assembly being conected to the terminals of a secondary winding 11 of a transformer 12 whose primary 13 is connected to an industrial supply network via a relay 14. The primary 7 forms with a discharge path 15, also constituting a discharge control means, a discharge circuit for a capacitor 16, the load circuit of which comprises, in addition to the primary winding 7, an impedance 17 formed by a resistor 18 having a capacitor 19 in parallel thereto, the whole assembly being connected to the terminals of a secondary winding 20 of a transformer 21, whose primary 22 is connected to the terminals of the supply circuit to the electrode 3. This supply circuit comprises on the side of the primary 22 and in parallel with the secondary of the transformer 1, firstly a capacitor 23 and secondly a resistor 24 in series with a capacitor 25. The capacitor 23 is connected in a manner to reduce to a minimum the impedance at high frequency in the high frequency discharge circuit, the operation of which will hereinafter be described.

In the aforegoing, the capacitor 9 forms a generator adapted to supply, across the high frequency transformer 6 – 2, pulses which are adapted to effect the initial striking of the arc. To this end, this capacitor 9 has a sufficient capacity and is supplied at quite a high voltage in order to develop by means of the transformer 6–2, pulses of sufficient strength, regulated by the spark gap in the arrester or discharge path 8, to ionise the atmosphere between the electrode 3 and the part 4 to be welded and thus ensure initial striking of the arc. It is not necessary during determination of this initial striking circuit to take into account the time constant of the load circuit of the capacitor 9 nor to be concerned too much about the parasitics which these discharges may produce, given that they are immediately interrupted as soon as the arc current has been formed. To this end, there may be provided in the supply circuit to the transformer 12, an interruption relay 14 slaved to the existence of an arc current, or directly to supply the primary 13 by the secondary voltage of the transformer which only presents the required value when the welding transformer 1 is under no-load conditions. On the otherhand, the circuit of the capacitor 16 is established in a manner to ensure discharges of lower strength which are rapidly developed in dependence upon the speed of variation of the arc voltage. It is convenient if, during a rapid increase in the voltage applied to the primary 22, the capacitor 16 charges very rapidly so that its discharge across the discharge path 15 and the primary winding 7 be released at the same instant which follows interruption of the current in the arc. To this end, the transformer 21 is of a type having a low short circuit impedance, the impedance 17 on the load circuit is formed by the resistor 18 with the capacitor 19 in parallel, the capacitor 19 having a capacity much greater than that of the capacitor 16 and the spark gap in the arrester or discharge path 15 is relatively small.

The oscillatory currents produced in the winding 2 and resulting either from discharge of the capacitor 9 or of the capacitor 16, close again across the inter-electrode space 3–4 and across the capacitor 23 which forms a short circuit for these high frequency oscillations. During initial striking, the circuit (capacitor 25 and damping resistor 24), enables an effective fine adjustment for the high frequency discharges in a manner to maintain or accentuate the ionisation in the inter-electrode space thus facilitating the establishment of the normal welding current supplied by the transformer 1.

In the embodiment shown in FIG. 1, the secondary 2 of the high frequency transformer 5 is in series in the supply circuit with the conductor forming the secondary of the electrode 3 and its section is thus in proportion to the welding current. It is also possible to effect "parallel" coupling of the same winding to the inter-electrode space without modifying the method of operation. Such a coupling is shown in FIG. 2 which shows the main supply circuit with the transformer 1, the electrode 3 and the part 4. Here the winding 2, which is made from fine wire, and a series capacitor 26 decoupling the industrial mains frequency, are connected to the terminals of the inter-electrode space 3–4 whilst a blocking inductor 27 for high frequency is connected in series in the wleding circuit between the high frequency circuit (2 – 26) and the secondary of the transformer 1.

By way of example for the initial striking circuit, the following values have been chosen for the embodiment shown:

Transformer 12: this is a leakeage path transformer whose secondary voltage under no-load is 4,000 volts, having a reduced short circuit impedance in the secondary of 400 k.

Discharge path 8: distance of the electrodes in air: 1 mm.

Capacitor 9: the capacity is 2,000 pF.

The circuit for maintaining the arc has the following characteristics:

Transformer 21: secondary voltage 2,000 volts, reduced short-circuit impedance in the secondary lower than 10 k Ω supplied at a voltage of the order of 75 volts which corresponds to the no-load voltage of the welding transformer 1.

Discharge path or arrester 15: separation of the electrodes 0.3 mm in air.

Capacitor 16: this has a capacitance of the order of 1,000 pF.

Impedance 17: this is constituted by a resistor of 600 k Ω and a capacitance of 5,000 pF.

The high frequency transformer has the following characteristics:

Winding 6: 4 turns of small diameter wire.
Winding 7: 4 turns of small diameter wire.
Winding 2: 8 turns, section to suit to the welding current strength.

The other elements of the circuit have the following values:

Capacitor 23: 1µF
Resistor 24: 10Ω
Capacitor 25: 16µF.

I claim:

1. An AC welding installation using a refractory electrode in an inert protective gas comprising a welding source of electrical energy at industrial frequency having a main supply circuit connected to a welding electrode; a first auxiliary cirucit for forming and emitting in said main circuit high frequency discharges of sufficient strength to cause initial striking of an arc, said first auxiliary circuit comprising a capacitor having a charge circuit connected to a first alternating current source through a first primary of a high frequency transformer having a secondary which is connected with said supply circuit so as to transfer the discharges to said main supply circuit and a discharge circuit comprising said first primary and a discharge path and means responsive to a flow of welding current through said arc to reduce the voltage of said alternating current source; a second auxiliary circuit for forming and emitting high frequency discharges of strength just sufficient to maintain the stability of the arc previously struck by said first auxiliary circuit, said second auxiliary circuit comprising a second capacitor having a charge circuit connected to a second alternating current source through a second primary of said high frequency transformer and through an impedance comprising a resistance in parallel with a third capacitor the capacity of which is much greater than that of said second capacitor and a discharge circuit constituted by said second primary and a second discharge path, said second alternating current source being a secondary of a transformer of the type having a low short circuit impedance, the primary of which is supplied by said welding source.

2. An AC welding installation as claimed in claim 1, said secondary of said high frequency transformer being connected in series in said main supply circuit to said electrode, and a capacitance forming a short circuit at the frequency of the discharge oscillations connected to termianls of the circuit formed by said secondary of said high frequency transformer and the interelectrode space.

3. An AC welding installation as claimed in claim 1, said secondary of said high frequency transformer being connected in series with a capacitor for decoupling the mains frequency, to the terminals of the interelectrode space, and a high impedance at high frequency connected in said main supply circuit between said welding source and the last-named capacitor.

* * * * *